United States Patent
Ali et al.

(10) Patent No.: US 12,162,303 B1
(45) Date of Patent: Dec. 10, 2024

(54) SODIUM ALGINATE NANOPARTICLES INTEGRATED WITH ANTHOCYANIDIN BIOMOLECULES FOR OPTICAL VALIDATION

(71) Applicant: KING FAISAL UNIVERSITY, Al-Ahsa (SA)

(72) Inventors: Mai Mostafa Khalaf Ali, Al-Ahsa (SA); Hany Mohamed Abd El-Lateef, Al-Ahsa (SA); Mohamed Gouda, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 9 days.

(21) Appl. No.: 18/419,019

(22) Filed: Jan. 22, 2024

(51) Int. Cl.
| | |
|---|---|
| *B42D 25/378* | (2014.01) |
| *C09B 67/02* | (2006.01) |
| *C09D 11/037* | (2014.01) |
| *C09D 11/107* | (2014.01) |
| *C09D 11/50* | (2014.01) |
| *C09K 9/02* | (2006.01) |
| *D21H 19/42* | (2006.01) |
| *D21H 19/58* | (2006.01) |

(Continued)

(52) U.S. Cl.
CPC ........ *B42D 25/378* (2014.10); *C09B 67/0097* (2013.01); *C09D 11/037* (2013.01); *C09D 11/107* (2013.01); *C09D 11/50* (2013.01); *C09K 9/02* (2013.01); *D21H 19/42* (2013.01); *D21H 19/58* (2013.01); *D21H 21/28* (2013.01); *D21H 21/48* (2013.01); *C09K 2211/1007* (2013.01); *C09K 2211/1018* (2013.01)

(58) Field of Classification Search
CPC .............. B42D 25/378; C09B 67/0097; C09D 11/037; C09D 11/107; C09D 11/50; C09K 9/02; C09K 2211/1007; C09K 2211/1018; D21H 19/42; D21H 19/58; D21H 21/28; D21H 21/48
See application file for complete search history.

(56) References Cited

U.S. PATENT DOCUMENTS

| | | |
|---|---|---|
| 9,193,863 B2 | 11/2015 | Lötzsch et al. |
| 10,119,154 B2 | 11/2018 | Hansen et al. |

(Continued)

FOREIGN PATENT DOCUMENTS

EP   2274381 A1   1/2011

OTHER PUBLICATIONS

Amal T. Mogharbel, Gadeer R. S. Ashour, Kholood Alkhamis, Ameena M. Al-bonayan, Matokah M. Abualnaja, Jihan Qurban, Hanadi A. Katouah, and Nashwa M. El-Metwaly, ACS Omega 2024 9 (1), 1562-1572. (Year: 2024).*

(Continued)

Primary Examiner — Bijan Ahvazi
(74) Attorney, Agent, or Firm — Nath, Goldberg & Meyer; Joshua B. Goldberg (57) ABSTRACT

A thermochromic ink and, particularly, to a thermochromic ink produced by combining an anthocyanidin extract with alginate. The thermochromic ink can be used for authentication purposes produced by combining an anthocyanidin (ACYD)-based *Brassica oleracea* L. var. *capitata* extract with an alginate (ALG). To increase the anthocyanidin/alginate ink stability, a mordant (ferrous sulfate) can be used to link the anthocyanidin biomolecules with the alginate.

19 Claims, 5 Drawing Sheets

(51) Int. Cl.
  *D21H 21/28*   (2006.01)
  *D21H 21/48*   (2006.01)

(56) References Cited

U.S. PATENT DOCUMENTS

| | | | |
|---|---|---|---|
| 10,548,836 | B2 | 2/2020 | Deroles et al. |
| 2008/0182019 | A1* | 7/2008 | Retter ............... B01J 13/04 |
| | | | 427/214 |
| 2008/0313822 | A1 | 12/2008 | Bertoldo De Barros et al. |
| 2017/0015852 | A1 | 1/2017 | Benohoud et al. |
| 2018/0334674 | A1* | 11/2018 | Kondo ............... A61K 47/6907 |

OTHER PUBLICATIONS

Giovana Bonat Celli, Amyl Ghanem and Marianne Su-Ling Brooks, Optimized encapsulation of anthocyanin-rich extract from haskap berries (*Lonicera caerulea* L.) in calcium-alginate microparticles, Journal of Berry Research 6 (2016) 1-11 (Year: 2016).*

Majdinasab, et al.; "Development of a novel colorimetric sensor based on alginate beads for monitoring rainbow trout spoilage". J Food Sci Technol. May 2018;55(5):1695-1704.

\* cited by examiner

SODIUM ALGINATE NANOPARTICLES INTEGRATED WITH ANTHOCYANIDIN BIOMOLECULES FOR OPTICAL VALIDATION

BACKGROUND

1. Field

The disclosure of the present patent application relates to a thermochromic ink and, particularly, to a thermochromic ink produced by combining an anthocyanidin extract with alginate.

2. Description of the Related Art

In order to make commercial products less vulnerable to counterfeiting, thermochromic inks have shown to be a viable security encoding strategy.

Thermochromism relates to the property of changing the color of a material, as a function of temperature, reversibly or irreversibly. This can be affected both by changing intensity and/or wavelength maximum. Irrespective of whether the thermochromic effect is of a reversible or irreversible nature, inorganic or organic dyes are used, the latter also in the form of composites with melting agents and/or developers, it is common to all systems that they always comprise toxic starting materials in some form. Standard in this respect is the use of bisphenol as a developer in almost all existing organic thermochromic composites. As dyes, basic structures of triphenylmethane dyes, pyridinium phenol betaines, sulphophthalein structures, thyranines, azo dyes, or fluoran dyes are often used.

Inorganic thermochromic pigments, the color change of which is based on a temperature-controlled change of modification, are based in general on salts of heavy metals. A known example is the use of thermochromic inorganic pigments as hot spot warning for pans or as screen printing for bar codes. Encapsulation of heavy metal salts or organic thermochromic composites likewise does not offer an alternative here; migration effects cannot be stopped permanently. The generally used melamine resins as a case for thermochromic capsules are definitively unsuitable as a protective layer and in addition are not suitable for extrusion technology.

In extrusion-blow molding, thermochromic pigments can be added only in partial regions of the wall thickness of a plastic material container. This takes place by the addition of a reversible thermochromic pigment in the form of strip-shaped inlays. The thermochromic pigments require in addition additional thermostable pigments and are added or fed to the extrudate before discharge from the extrusion head.

To date, thermochromic inks, screen printing inks, coatings, or films have not been used in sensitive areas, such as the foodstuff sector, medical technology, or anti-counterfeiting technology. The most recent thermochromic dyes with a diazapentalene structure have yet to offer an approach to the solution.

Thus, a thermochromic ink formed of further materials is desired.

SUMMARY

The present subject matter relates to the development of a thermochromic ink that can be used, by way of non-limiting example, for authentication purposes produced by combining an anthocyanidin (ACYD)-based *Brassica oleracea* L. var. *capitata* extract with an alginate (ALG). To increase the anthocyanidin/alginate ink stability, a mordant (ferrous sulfate) can be used to link the anthocyanidin biomolecules with the alginate. ACYD can be extracted from red-cabbage and then immobilized into the alginate to serve as an environmentally friendly spectroscopic probe.

Thermochromic composite inks (ACYD@ALG) can be made by adjusting the content of anthocyanidin. By way of non-limiting example, a homogenous film of blue color (608 nm) printed on a paper surface was studied by the International Commission on Illumination (CIE) Lab color coordinate system, which confirmed that the blue color transformed into reddish (477 nm) when heated from 35 to 65° C.

Nanoparticles (NPs) of the anthocyanidin/mordant (ACYD/M) can be obtained having diameters of about 80 nm to about 90 nm, whereas the ACYD/M-encapsulated alginate nanoparticles can have diameters of about 120 nm to about 150 nm. Multiple analytical methods are utilized to examine the printed papers using the present thermochromic composite inks. The mechanical and rheological performance of both stamped sheets and ink fluid were explored. The cytotoxicity and antimicrobial efficacy of ink (ACYD@ALG) were investigated.

Infrared spectra (FT-IR), energy-dispersive X-ray spectroscopy (EDS), scanning electron microscope (SEM), and X-ray fluorescence analysis (XRF) can be employed to determine the morphology and chemical composition of the prepared thermochromic inks.

Accordingly, in an embodiment, the present subject matter relates to a method of making nanoparticles having an alginate (ALG) shell and an anthocyanidin (ACYD) core (ACYD@ALG nanoparticles), the method comprising: stirring sodium alginate in water at about 80° C. to about 90° C. to obtain a clear aqueous solution; mixing the anthocyanidin with the clear aqueous solution to obtain an ACYD@ALG aqueous solution; adding a mordant to the ACYD@ALG aqueous solution with stirring and ultrasonic treatment to obtain a uniform viscous fluid; encapsulating the uniform viscous fluid with calcium chloride as a cross-linking agent; and obtaining an aqueous suspension of the nanoparticles having an alginate (ALG) shell and an anthocyanidin (ACYD) core (ACYD@ALG nanoparticles).

In another embodiment, the present subject matter relates to anthocyanidin/alginate nanoparticles (ACYD@ALG nanoparticles) produced according to the methods described herein.

In a further embodiment, the present subject matter relates to a thermochromic ink comprising the ACYD@ALG nanoparticles as described herein.

In an additional embodiment, the present subject matter relates to a method of imprinting a sheet of paper with ink to prevent counterfeiting, the method comprising applying the thermochromic ink as described herein to the sheet of paper.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not. For example, "optionally substituted alkyl" means either "alkyl" or "substituted alkyl," as defined herein.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to the development of a thermochromic ink that can be used, by way of non-limiting example, for authentication purposes produced by combining an anthocyanidin (ACYD)-based *Brassica oleracea* L. var. *capitata* extract with an alginate (ALG). To increase the anthocyanidin/alginate ink stability, a mordant (ferrous sulfate) can be used to link the anthocyanidin biomolecules with the alginate. ACYD can be extracted from red-cabbage and then immobilized into the alginate to serve as an environmentally friendly spectroscopic probe.

Thermochromic composite inks (ACYD@ALG) can be made by adjusting the content of anthocyanidin. By way of non-limiting example, a homogenous film of blue color (608 nm) printed on a paper surface was studied by the International Commission on Illumination (CIE) Lab color coordinate system, which confirmed that the blue color transformed into reddish (477 nm) when heated from 35 to 65° C.

Nanoparticles (NPs) of the anthocyanidin/mordant (ACYD/M) can be obtained having diameters of about 80 nm to about 90 nm, whereas the ACYD/M-encapsulated alginate nanoparticles can have diameters of about 120 nm to about 150 nm. Multiple analytical methods are utilized to examine the printed papers using the present thermochromic composite inks. The mechanical and rheological performance of both stamped sheets and ink fluid were explored. The cytotoxicity and antimicrobial efficacy of ink (ACYD@ALG) were investigated.

Infrared spectra (FT-IR), energy-dispersive X-ray spectroscopy (EDS), scanning electron microscope (SEM), and X-ray fluorescence analysis (XRF) can be employed to determine the morphology and chemical composition of the prepared thermochromic inks.

Accordingly, in an embodiment, the present subject matter relates to a method of making nanoparticles having an alginate (ALG) shell and an anthocyanidin (ACYD) core (ACYD@ALG nanoparticles), the method comprising: stirring sodium alginate in water at about 80° C. to about 90° C. to obtain a clear aqueous solution; mixing the anthocyanidin with the clear aqueous solution to obtain an ACYD@ALG aqueous solution; adding a mordant to the ACYD@ALG aqueous solution with stirring and ultrasonic treatment to obtain a uniform viscous fluid; encapsulating the uniform viscous fluid with calcium chloride as a cross-linking agent; and obtaining an aqueous suspension of the nanoparticles having an alginate (ALG) shell and an anthocyanidin (ACYD) core (ACYD@ALG nanoparticles).

In one embodiment, the cross linking with the calcium chloride can result in cross-linked Ca-alginate films according to the following Scheme 1:

In other embodiments of the present production methods, about 0.5% to about 7% of the anthocyanidin (ACYD) can be mixed with the clear aqueous solution. The ACYD that can be used herein may be extracted, by way of non-limiting example, from red cabbage. In this regard, the ACYD can be prepared by a method comprising: chopping and macerating red cabbage in a combination of methyl alcohol and water, adding hydrochloric acid to the combination to lower the pH of the combination, for example, to pH 2; refrigerating the combination for about 3 days; centrifuging the combination to remove solid waste, thereby obtaining a red solution; extracting leftover red solution using a solvent; evaporating the solvent; subjecting the red solution to hydrochloric acid to obtain a dark reddish-violet solution; chilling the dark reddish-violet solution to obtain powdered anthocyanidin chloride; and adding the powdered anthocyanidin chloride to methanol to obtain an ACYD extract.

In one embodiment of making the ACYD, the methyl alcohol and water can be added in a 1:3 volumetric ratio. In another embodiment, the refrigeration can be at about 4° C. In a further embodiment, the centrifugation can be at about 2,000 rpm for about 15 minutes. In certain embodiments, the solvent used can be chloroform. In other embodiments, the chilling step can be conducted for about 1 hour.

The anthocyanidin produced according to the present methods can include the following isomers:

In certain embodiments of the present production methods, the sodium alginate can be stirred in the water for about 60 minutes.

Carbinol
(colorless)

In additional embodiments of the present production methods, the mordant can be ferrous sulfate. In this regard, about 5% by weight, relative to the ACYD weight, of the ferrous sulfate can be added to the ACYD@ALG aqueous solution.

In further embodiments of the present production methods, after the ferrous sulfate is added, the ACYD@ALG aqueous solution can be stirred for about 60 minutes followed by ultrasonic treatment for about 15 minutes at about 25 kHz.

In other embodiments of the present production methods, the calcium chloride can be added as an about 6M aqueous solution. In this regard, the ACYD@ALG nanoparticles can be produced at a frequency of 3000 Hz and a constant flow rate of about 45 mg/s.

In additional embodiments of the present production methods, the production method can further comprise dialyzing the aqueous suspension of the ACYD@ALG nanoparticles using a porous membrane followed by freeze drying to obtain an ACYD@ALG nanopowder. In this regard, the porous membrane can be an about 6000 to about 8000 Dalton porous membrane.

In another embodiment, the present subject matter relates to anthocyanidin/alginate nanoparticles (ACYD@ALG nanoparticles) produced according to the methods described herein.

Accordingly, in an embodiment, the ACYD@ALG nanoparticles can have a diameter of about 120 nm to about 150 nm. Similarly, the ACYD@ALG nanoparticles can comprise an anthocyanidin core comprising the anthocyanidin linked with the mordant (ACYD/M nanoparticles) encapsulated within an alginate shell. These ACYD/M nanoparticles can have a diameter of about 80 nm to about 90 nm.

In certain embodiments, the anthocyanidin can be an anthocyanidin-based *Brassica oleracea* L. var. *Capitata* extract.

In a further embodiment, the present subject matter relates to a thermochromic ink comprising the ACYD@ALG nanoparticles as described herein.

In certain embodiments in this regard, the thermochromic ink can further comprise water, polyacrylic acid, ammonium hydroxide, and $(NH_4)_2HPO_4$. In other embodiments, the thermochromic ink can be blue. In additional embodiments, the thermochromic ink can change color from blue to red when heated to from about 35° C. to about 65° C.

In an additional embodiment, the present subject matter relates to a method of imprinting a sheet of paper with ink to prevent counterfeiting, the method comprising applying the thermochromic ink as described herein to the sheet of paper.

In a further embodiment, the present subject matter relates to a method of suppressing the development of bacterial development comprising exposing the bacteria to the ACYD@ALG nanoparticles as descried herein. Certain bacteria which can be suppressed according to these methods include, by way of non-limiting example, *E. coli* and *S. aureus*.

Different amounts of ACYD, including 0.5% ($ACYD_1$), 1% ($ACYD_2$), 2% ($ACYD_3$), 3% ($ACYD_4$), 4% ($ACYD_5$), 5% ($ACYD_6$), 6% ($ACYD_7$), and 7% ($ACYD_8$) w/w, are used herein. The aforementioned solutions can be exposed to casting in a Petri plate (Teflon) to produce blue films of ACYD@ALG that are then air-dried for 12 hours. The provided films can be exposed to freeze-drying, followed by immersion in $CaCl_{2(aq)}$ (6 M), and then air-dried for 12 hours.

The following examples illustrate the present teachings.

EXAMPLES

Example 1

Anthocyanidin Extraction

Red-cabbage (600 g) was finely chopped and macerated in a combination of methyl alcohol and distilled water (1:3; 300 mL). Then, hydrochloric acid (1 mol/L) was added to lower the pH to 2. The combination was placed in a refrigerator at 4° C. for 3 days. The filtered mixture was exposed to centrifugation at 2,000 rpm for 15 minutes. After the solid waste was disposed, chloroform was employed to extract the leftover red solution. Chloroform was then evaporated by a rotary-evaporator maintained at 45° C. After being subjected to a strong hydrochloric acid in a bubbling bath, the provided solution changed to a dark reddish-violet color. The solution was chilled to produce a deep brown powder (anthocyanidin chloride). After being sifted, the resultant powder was dried out. The purification of the extract was accomplished using Sephadex LH-20 and methanol. Anthocyanidin (1.5 mg) was added to methanol (5.0 mL) to make a standardized anthocyanidin solution. After chilling for one hour, the given combination was stable. For determining the purity of the anthocyanin extract, an HPLC Agilent 1100 was employed. Shinoda's experiment identified the anthocyanidin flavonoid nature by adding Mg strip and 1 mL of HCl.

Example 2

Preparation of ACYD@ALG Nanoparticles

Sodium alginate (2 g) was stirred in distilled water (100 mL) for 60 minutes at 85° C. to create a clear aqueous solution. Anthocyanidin of Example 1 was mixed with the sodium alginate aqueous solution at varying concentrations. The resultant solutions were mechanically stirred for 15 minutes. Ferrous sulfate (5% relative to ACYD weight) was added to the aforementioned ACYD@ALG aqueous solution. The provided mixture was well blended after 60 minutes of stirring and 15 minutes of ultrasonic (25 kHz) treatment to ensure the production of a uniform, colorless, and viscous fluid, the combination was stirred for 30 minutes and ultrasonicated (25 kHz) for 15 minutes.

Applied concentrations of anthocyanidin ranged between 0.5, 1, 2, 3, 4, 5, 6 and 7% (w/w), indicated by $ACYD_1$ to $ACYD_8$, respectively. The produced solution was inserted to a B390 BUCHI encapsulation system (Switzerland) paired with concentric nozzle, plastic syringe (50 mL), and a compressor. An aqueous solution of calcium chloride (6 M) was utilized as a cross-linking agent, providing nanoparticles of calcium alginate shell and a core of ACYD. Scheme 1 provided above illustrates the cross-linking process of calcium alginate to produce a suspension of ACYD@ALG nanoparticles.

The ACYD@ALG nanoparticles were produced at a frequency of 3000 Hz and a constant flow rate of ~45 mg/s. To produce ACYD@ALG nanopowder, an aqueous suspension of ACYD@ALG nanoparticles was dialyzed utilizing a porous membrane (6000-8000 Da), followed by freeze-drying. Additionally, the present solutions were exposed to casting in a Petri plate (Teflon) to produce blue films of ACYD@ALG that were then air-dried for 12 hours. The provided films were exposed to freeze-drying, followed by immersion in $CaCl_{2(aq)}$ (6 M), and then air-dried for 12 hours.

Example 3

Preparation of Thermochromic Ink

A mixture of de-ionized water (83%), polyacrylic acid (15%; w/w), ammonium hydroxide (1%; w/w), and $(NH_4)_2HPO_4$ (1%; w/w) was mechanically stirred for 30 minutes. The provided solution was admixed with the ACYD@ALG nanopowder by mechanical stirring for 30 minutes, and ultrasonication (25 kHz) for 30 minutes to guarantee a consistent dispersion. The produced blue nanocomposite ink was then stamped on a sheet of Whatman paper using a wooden stamp. The printed pattern was left for 15 minutes on a flat clean surface to air-dry, and then exposed to thermofixation at 140° C. for 3 minutes. $ACYD_0$ represents the blank paper sheet.

Regarding the features of the thus produced thermochromic nanocomposite inks, FIGS. 1A, 1B, and 1C show TEM images of the anthocyanidin linked with ferrous sulfate as a mordant (ACYD/M) in alginate capsules. These figures display the measured sizes of ACYD/M nanoparticles, which range from 80 nm to 90 nm. FIGS. 2A-2F display the TEM images of ACYD/M immobilized in alginate (ACYD@ALG) and show the sizes of ACYD@ALG nanocomposite with diameters of 120-150 nm.

The presence of bioactive phenols in the anthocyanin extract is shown by HPLC analysis, as summarized in Table 1.

TABLE 1

HPLC analysis of red-cabbage extract.

| Phenols | Amount (wt %) |
|---|---|
| Cinnamic acid | 2.53 |
| Quercetin | 5.23 |
| Kaempferol | 41.67 |
| Rutin | 17.30 |
| Vanillin | 0.95 |
| Caffeic acid | 0.86 |
| Chlorogenic acid | 3.18 |
| Acacetin | 0.83 |
| Quercetin-7,3'-dimethylether | 4.50 |
| Catechin | 0.90 |
| Quercetin-7-methylether | 1.05 |
| Gallic acid | 0.84 |
| Chrysin | 0.96 |
| P-Coumaric acid | 1.06 |
| Ferulic acid | 21.13 |

By increasing or decreasing the system temperature between 35° C. and 65° C., the deprotonation/protonation process can be inverted. Four isomers of anthocyanidin, including quinoid anion, carbinol, flavylium cation and chalcone, are detectable by increasing the temperature as shown above. The flavylium cation (red) predominates at high temperatures, whereas the quinoidal isomer (blue) is the more common isomer at low temperatures. The addition of different amounts of anthocyanidin to a solution of alginate resulted in the formation of thick nanocomposite ink fluid. After that, ferrous sulfate was added to the ACYD@ALG solution. The nanocomposite-based inks take on a blue color. The paper was stamped using the nanocomposite ink. When heated from 35° C. to 65° C., the imprinted layers exhibited temperature-induced chromism to change color from blue to red, demonstrating anti-counterfeiting security.

Example 4

Morphological Properties

The surface morphology of ACYD @ALG film and $ACYD_8$ was investigated via scanning electron microscopic images (SEM) as shown in FIGS. 3A-3D. The film's surface looks quite similar to that of the ACYD-free nanocomposite ink film ($ACYD_0$). Sheets printed with ACYD@ALG pattern were also produced. The morphological examination of the paper surface where the thermochromic ACYD@ALG prints were made is shown in FIGS. 4A-4D. SEM images demonstrated that ACYD/M particles were integrated into the sheet surface. FIGS. 4A-4D demonstrate that prints were unaffected by raising the anthocyanidin level in the alginate nanocomposite ink. Forming ferric coordination bonds with both of ACYD and alginate hydroxyls can account for the regular distribution of the ACYD/M nanoparticles throughout the alginate nanoparticles.

The diameters of ACYD/M-encapsulated alginate nanoparticles were measured using SEM Image J software to be between 100 and 450 nm. The diameters of alginate nanoparticles were found to increase upon increasing the dye content. The increased diameters of alginate nanoparticles deposited onto paper surface are attributed to the formation of clusters of alginate nanoparticles. The EDS results of blank and printed papers are shown in Table 2, below.

TABLE 2

EDX analysis (wt %) of $ACYD_0$, $ACYD_1$, $ACYD_5$, and $ACYD_8$ at different sites ($St_1$, $St_2$, and $St_3$) on sample surface.

| Prints | | C | O | Ca | Fe |
|---|---|---|---|---|---|
| $ACYD_0$ | | 68.31 | 31.69 | — | — |
| $ACYD_1$ | $St_1$ | 65.83 | 31.41 | 2.12 | 0.64 |
| | $St_2$ | 65.61 | 31.12 | 2.70 | 0.57 |
| | $St_3$ | 65.57 | 31.50 | 2.47 | 0.46 |
| $ACYD_5$ | $St_1$ | 65.31 | 31.01 | 2.60 | 1.08 |
| | $St_2$ | 65.24 | 31.34 | 2.21 | 1.21 |
| | $St_3$ | 65.00 | 31.50 | 2.48 | 1.02 |
| $ACYD_8$ | $St_1$ | 65.02 | 31.43 | 2.21 | 1.34 |
| | $St_2$ | 64.19 | 31.72 | 2.65 | 1.44 |
| | $St_3$ | 65.50 | 30.37 | 2.78 | 1.35 |

EDX examination of the blank sample confirmed that carbon and oxygen are its major constituents. EDX examination of prints verified the presence of oxygen and carbon as the two major constituents of the cellulose sheet and anthocyanidin chromophore. On the other side, iron and calcium were detected by EDX in low concentrations due to the use of $FeSO_4$ as mordant and calcium chloride as a cross-linking agent, respectively. Three locations on paper surface displayed almost identical elemental concentrations as determined by EDX, indicating a consistent dispersion of ACYD/M on paper sheets. EDS analysis confirmed that the elemental composition of the ACYD@ALG thermochromic prints was consistent with the constituent molar ratios employed to create them.

Figure 1A:
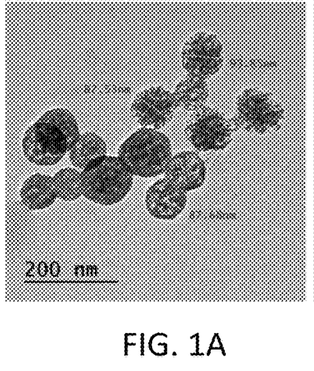
FIGS. 1A, 1B, and 1C show transmission electron microscope (TEM) photos of embodiments of nanoparticles of the anthocyanidin/mordant (ACYD/M) particles as described herein.
Figure 1B:
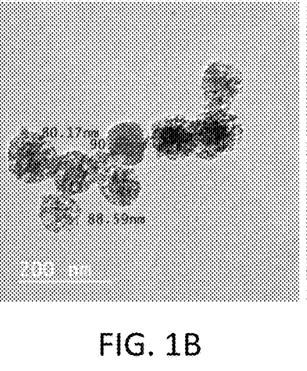
Figure 1C:
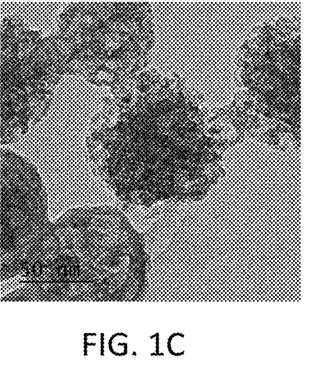
Figure 2A:
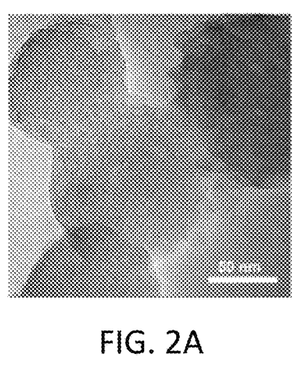
FIGS. 2A, 2B, 2C, 2D, 2E, and 2F show TEM photos of the ACYD/M-encapsulated calcium alginate particles at varying levels of magnification.
Figure 2B:
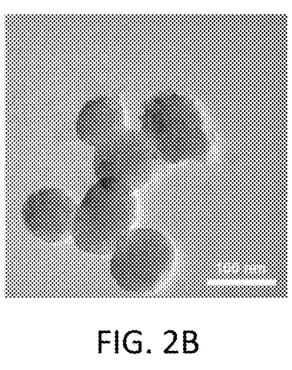
Figure 2C:
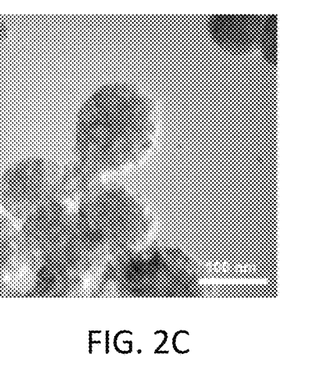
Figure 2D:
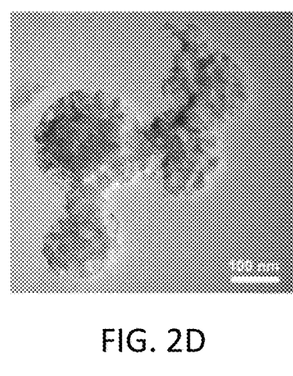
Figure 2E:
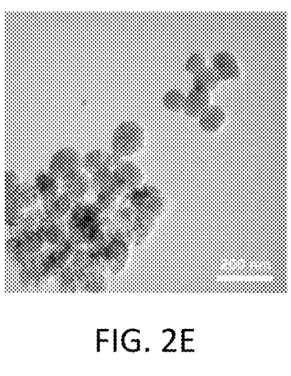
Figure 2F:
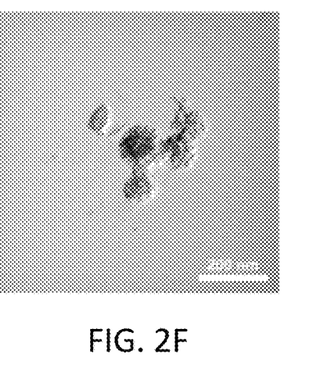
Figure 3A:
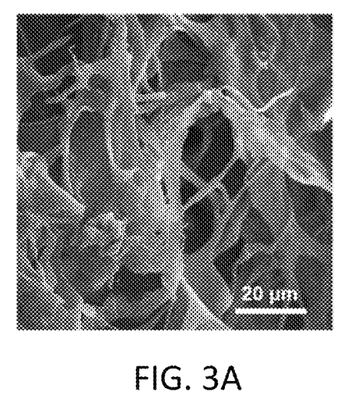
FIGS. 3A, 3B, 3C, and 3D show SEM micrographs of the ACYD@ALG film, $ACYD_8$.
Figure 3B:
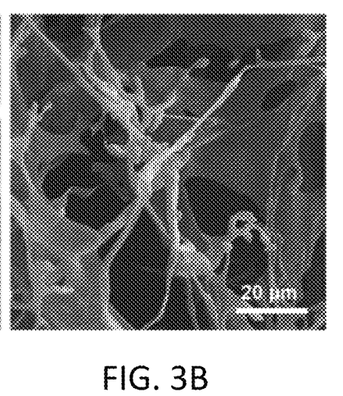
Figure 3C:
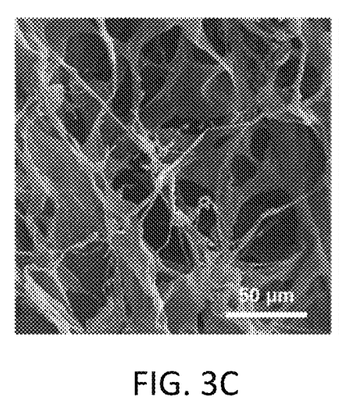
Figure 3D:
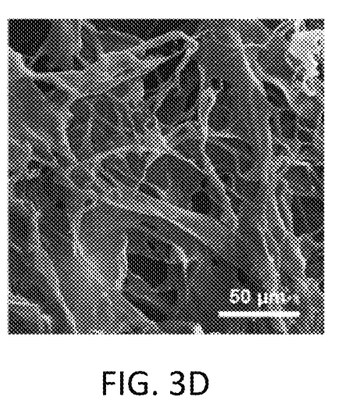
Figure 4A:
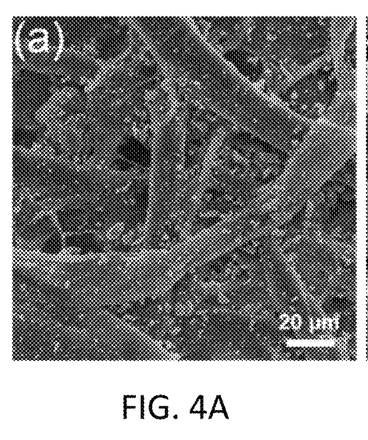
FIGS. 4A, 4B, 4C, and 4D show SEM micrographs of the ACYD@ALG prints, $ACYD_1$ (FIGS. 4A and 4B) and $ACYD_8$ (FIGS. 4C and 4D).
Figure 4B:
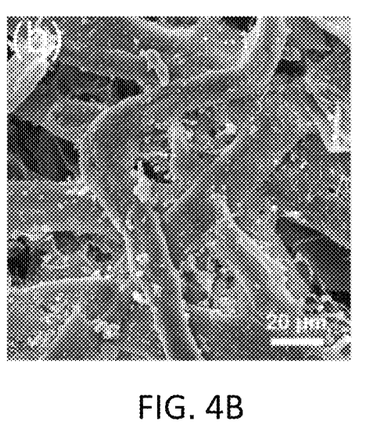
Figure 4C:
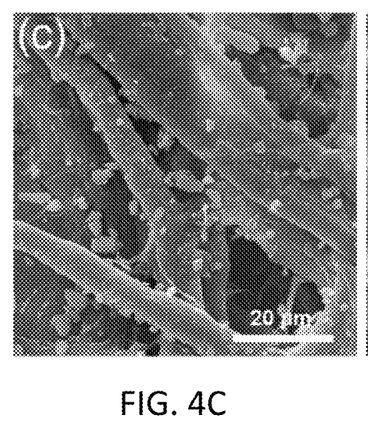
Figure 4D:
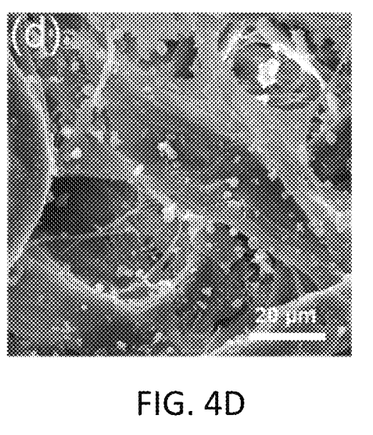
Figure 5:
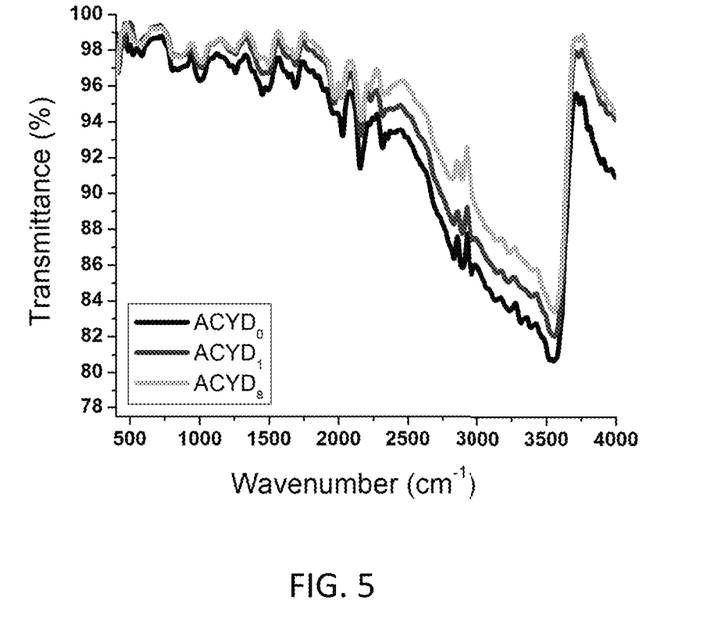
FIG. 5 shows an FTIR spectra of ACYD@ALG prints.

As illustrated in FIG. 5, the infrared spectral analysis of stamped sheets showed absorbance maxima at 3551 cm$^{-1}$ owing to cellulosic hydroxyl stretching vibration, 2872 cm$^{-1}$ due to C—H aliphatic stretching vibration, and 1002 cm$^{-1}$ owing to C—H aliphatic bending vibration. The stretching vibration of the carbonyl groups in alginate led to the detection of an absorption peak at 1691 cm$^{-1}$. Stamping the paper sheet generated the ACYD@ALG coating, which decreased the hydroxyl peak intensity (3551 cm$^{-1}$) due to coordination with ACYD@ALG particles. Similarly, the inclusion of ACYD/M in the alginate medium resulted in a decrement in the carbonyl peak intensity at 1754 cm$^{-1}$.

Example 5

Colorimetric Properties

Table 3 illustrates the findings of the CIE Lab analysis of colorimetric shifts in ACYD@ALG prints. When the temperature is increased from 35° C. to 65° C., the printed patterns instantly change color from blue to red. However, the printed patterns regained their original blue hue when cooled to 35° C. CIE Lab and K/S values changed very little when the anthocyanidin ratio was changed from $ACYD_1$ to $ACYD_8$. A change in thermochromism from blue to red was verified by an increase in L* from 35° C. to 65° C. While the +a* values remained unchanged between 35° C. and 65° C., and the −b* values became positive. The greater the anthocyanidin ratio, the darker the blue hue, as measured by the K/S ratio. In addition, a change in colorimetry from blue to red of high tinctorial strength was indicated by an increase in K/S at higher temperatures.

TABLE 3

Colorimetric screening of ACYD@ALG prints at 35° C. and 65° C.; where, K/S represents color strength, L* is lightness from white (100) to black (0), a* signifies colors between green (−) and red (+), and b* signifies colors between blue (−) and yellow (+).

| ACYD ratio | K/S | | L* | | a* | | b* | |
|---|---|---|---|---|---|---|---|---|
| | 35° C. | 65° C. | 35° C. | 65° C. | 35° C. | 65° C. | 35° C. | 65° C. |
| $ACYD_0$ | 0.70 | 0.51 | 93.63 | 93.59 | 0.10 | 0.05 | −1.28 | 1.11 |
| $ACYD_1$ | 2.26 | 1.97 | 57.89 | 63.99 | 22.08 | 7.51 | −5.35 | 3.47 |
| $ACYD_2$ | 2.54 | 2.03 | 54.90 | 63.17 | 20.40 | 8.24 | −7.66 | 3.07 |
| $ACYD_3$ | 3.02 | 2.40 | 52.40 | 62.25 | 18.32 | 10.40 | −8.85 | 2.83 |
| $ACYD_4$ | 3.26 | 2.69 | 50.06 | 59.21 | 14.41 | 13.68 | −10.87 | 2.64 |
| $ACYD_5$ | 3.31 | 2.84 | 49.78 | 57.29 | 13.62 | 16.62 | −13.25 | 2.37 |
| $ACYD_6$ | 3.73 | 2.93 | 47.64 | 56.37 | 10.99 | 21.03 | −15.39 | 2.01 |
| $ACYD_7$ | 3.99 | 3.11 | 46.53 | 55.73 | 10.25 | 24.70 | −16.46 | 1.86 |
| $ACYD_8$ | 4.45 | 3.28 | 45.84 | 55.22 | 9.70 | 26.05 | −17.07 | 1.50 |

Figure 6:
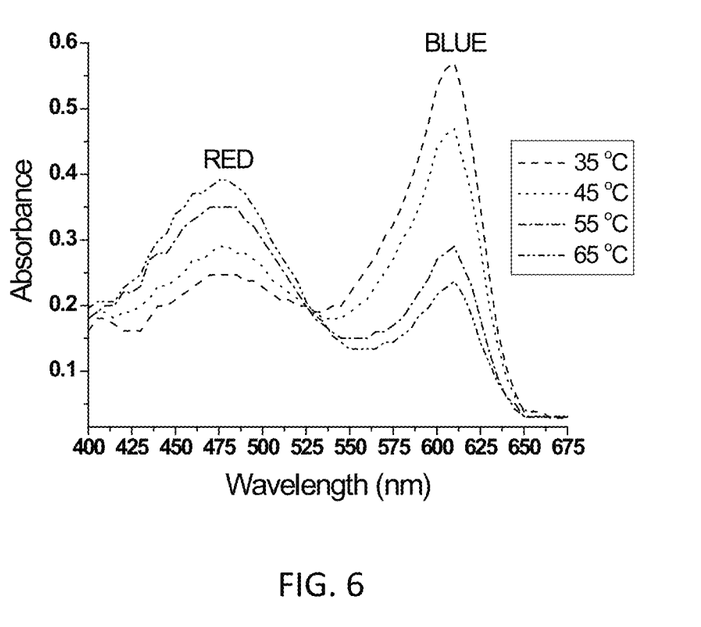
FIG. 6 is a graph showing the temperature effect on absorbance spectra of $ACYD_5$.
Figure 7:
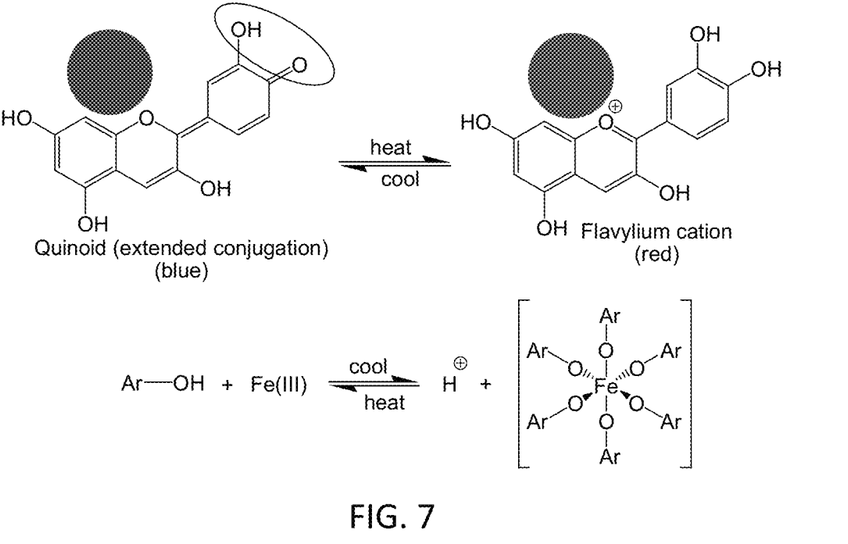
FIG. 7 shows suggested mechanisms for the creation/dissociation of ACYD/M complex; Ar—OH represents ACYD. The temperature effect on ACYD@ALG printed paper ($ACYD_5$) showed a change in color from blue to reddish upon exposure to heat from 35° C. to 65° C., respectively.

FIG. 6 displays the $ACYD_5$ absorption spectra upon raising the temperature from 35° C. to 65° C. Temperature was shown to increase the strength of the absorbance intensity at 477 nm, whereas it reduced at 608 nm. The hydroxyl groups in alginate and anthocyanidin contributed to the formation of a blue coordination complex (ACYD/M) with iron(III). This coordination decreases as temperature increases as shown in FIG. 8.

Example 6

Biological Studies

A high survival rate of 94% at 48 hours demonstrates the excellent cytocompatibility of ACYD@ALG. Table 4 shows that the ACYD-containing casted films suppress the development of E. coli and S. aureus. Because it lacks any antibacterial agents, the blank film ($ACYD_0$) is ineffective against microorganisms. The ACYD-containing casted films with the lowest quantity of anthocyanidin ($ACYD_1$) was able to kill bacteria. Increasing the anthocyanidin ratio meant better bacterial suppression.

TABLE 4

Antibacterial properties of ACYD@ALG casted films against E. coli and S. aureus.

| | Bacterial reduction (%) | |
|---|---|---|
| Film | E. coli | S. aureus |
| $ACYD_1$ | 33 ± 1.1 | 30 ± 1.2 |
| $ACYD_2$ | 35 ± 1.0 | 32 ± 1.0 |
| $ACYD_3$ | 39 ± 1.0 | 36 ± 1.5 |
| $ACYD_4$ | 44 ± 1.1 | 38 ± 1.3 |
| $ACYD_5$ | 49 ± 1.5 | 43 ± 1.0 |
| $ACYD_6$ | 52 ± 1.1 | 46 ± 1.1 |
| $ACYD_7$ | 54 ± 1.7 | 49 ± 1.5 |
| $ACYD_8$ | 55 ± 1.0 | 50 ± 1.4 |

It is to be understood that the thermochromic ink materials described herein are not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making nanoparticles having an alginate (ALG) shell and an anthocyanidin (ACYD) core (ACYD@ALG nanoparticles), the method comprising:
   stirring sodium alginate in water at about 80° C. to about 90° C. to obtain a clear aqueous solution;
   mixing the anthocyanidin with the clear aqueous solution to obtain an ACYD@ALG aqueous solution;
   adding a mordant to the ACYD@ALG aqueous solution with stirring and ultrasonic treatment to obtain a uniform viscous fluid;
   encapsulating the uniform viscous fluid with calcium chloride as a cross-linking agent; and obtaining an aqueous suspension of the nanoparticles having an alginate (ALG) shell and an anthocyanidin (ACYD) core (ACYD@ALG nanoparticles);

wherein the ACYD@ALG nanoparticles are produced at a frequency of 3000 Hz and a constant flow rate of about 45 mg/s.

2. The method of making nanoparticles having an alginate (ALG) shell and an anthocyanidin (ACYD) core (ACYD@ALG nanoparticles) of claim 1, wherein the sodium alginate is stirred in the water for about 60 minutes.

3. The method of making nanoparticles having an alginate (ALG) shell and an anthocyanidin (ACYD) core (ACYD@ALG nanoparticles) of claim 1, wherein about 0.5% to about 7% of the anthocyanidin (ACYD) is mixed with the clear aqueous solution.

4. The method of making nanoparticles having an alginate (ALG) shell and an anthocyanidin (ACYD) core (ACYD@ALG nanoparticles) of claim 3, wherein the mordant is ferrous sulfate.

5. The method of making nanoparticles having an alginate (ALG) shell and an anthocyanidin (ACYD) core (ACYD@ALG nanoparticles) of claim 4, wherein about 5% by weight, relative to the ACYD weight, of the ferrous sulfate is added to the ACYD@ALG aqueous solution.

6. The method of making nanoparticles having an alginate (ALG) shell and an anthocyanidin (ACYD) core (ACYD@ALG nanoparticles) of claim 1, wherein, after the ferrous sulfate is added, the ACYD@ALG aqueous solution is stirred for about 60 minutes followed by ultrasonic treatment for about 15 minutes at about 25 kHz.

7. The method of making nanoparticles having an alginate (ALG) shell and an anthocyanidin (ACYD) core (ACYD@ALG nanoparticles) of claim 1, wherein the calcium chloride is added as an about 6M aqueous solution.

8. The method of making nanoparticles having an alginate (ALG) shell and an anthocyanidin (ACYD) core (ACYD@ALG nanoparticles) of claim 1, further comprising dialyzing the aqueous suspension of the ACYD@ALG nanoparticles using a porous membrane followed by freeze drying to obtain an ACYD@ALG nanopowder.

9. The method of making nanoparticles having an alginate (ALG) shell and an anthocyanidin (ACYD) core (ACYD@ALG nanoparticles) of claim 8, wherein the porous membrane is an about 6000 to about 8000 Dalton porous membrane.

10. Anthocyanidin/alginate nanoparticles (ACYD@ALG nanoparticles) produced according to the method of claim 8.

11. The anthocyanidin/alginate nanoparticles (ACYD@ALG nanoparticles) of claim 10, wherein the ACYD@ALG nanoparticles have a diameter of about 120 nm to about 150 nm.

12. The anthocyanidin/alginate nanoparticles (ACYD@ALG nanoparticles) of claim 10, wherein the ACYD@ALG nanoparticles comprise an anthocyanidin core comprising the anthocyanidin linked with the mordant (ACYD/M nanoparticles) encapsulated within an alginate shell.

13. The anthocyanidin/alginate nanoparticles (ACYD@ALG nanoparticles) of claim 12, wherein the ACYD/M nanoparticles have a diameter of about 80 nm to about 90 nm.

14. The anthocyanidin/alginate nanoparticles (ACYD@ALG nanoparticles) of claim 10, wherein the anthocyanidin is an anthocyanidin-based *Brassica oleracea* L. var. *Capitata* extract.

15. A thermochromic ink comprising the ACYD@ALG nanoparticles of claim 10.

16. The thermochromic ink of claim 15, wherein the thermochromic ink further comprises water, polyacrylic acid, ammonium hydroxide, and $(NH_4)_2HPO_4$.

17. The thermochromic ink of claim 15, wherein the thermochromic ink is blue.

18. The thermochromic ink of claim 15, wherein the thermochromic ink changes color from blue to red when heated to from about 35° C. to about 65° C.

19. A method of imprinting a sheet of paper with ink to prevent counterfeiting, the method comprising applying the thermochromic ink of claim 15 to the sheet of paper.

* * * * *